A. PARSHIN.
ELECTRICALLY OPERATING MECHANISM FROM A DISTANCE.
APPLICATION FILED NOV. 20, 1918.

1,397,449.

Patented Nov. 15, 1921.

Witnesses

Inventor
Alexander Parshin,
by
Attorney

A. PARSHIN.
ELECTRICALLY OPERATING MECHANISM FROM A DISTANCE.
APPLICATION FILED NOV. 20, 1918.

1,397,449.

Patented Nov. 15, 1921.
8 SHEETS—SHEET 3.

Witnesses

Inventor
Alexander Parshin,
by
Attorney

A. PARSHIN.
ELECTRICALLY OPERATING MECHANISM FROM A DISTANCE.
APPLICATION FILED NOV. 20, 1918.

1,397,449.

Patented Nov. 15, 1921.
8 SHEETS—SHEET 4.

Witnesses

Inventor
Alexander Parshin,
by
Attorney

A. PARSHIN.
ELECTRICALLY OPERATING MECHANISM FROM A DISTANCE.
APPLICATION FILED NOV. 20, 1918.

1,397,449.

Patented Nov. 15, 1921.
8 SHEETS—SHEET 7.

Witnesses

Inventor
Alexander Parshin,
by
Attorney.

UNITED STATES PATENT OFFICE.

ALEXANDER PARSHIN, OF LONDON, ENGLAND.

ELECTRICALLY OPERATING MECHANISM FROM A DISTANCE.

1,397,449.  Specification of Letters Patent.  Patented Nov. 15, 1921.

Application filed November 20, 1918. Serial No. 263,288.

*To all whom it may concern:*

Be it known that I, ALEXANDER PARSHIN, a citizen of Russia, residing in London, England, have invented certain new and useful Electrically Operating Mechanisms From a Distance, of which the following is a specification.

This invention relates to a system of operating electrically from a distance a number of mechanisms, so that they run synchronously, and has for its principal objects to insure synchronism and render the installation silent and durable by suppressing, in simple manner, noisy and injurious sparking.

The main feature of the invention by which these objects are attained is the use of an electric circuit carrying current which periodically increases and diminishes in strength, electric motors connected in parallel in this circuit and means such as a single relay for controlling the circuit and for opening it at a moment when the current strength in it is about zero value. When the circuit is closed each motor starts and continues in operation until the relay is again actuated to open the circuit.

Since the whole operation required of each mechanism is performed as a result of a single closing and opening of a circuit, the use of a single relay of itself determines great reduction of noise and wear. This advantage is very much increased owing to the fact that both the closing and the opening of the circuit occurs when there is practically no current strength.

The invention is applicable for controlling mechanisms of any suitable kind, but particularly for gun-fire controlling or directing, it will be convenient to refer to the controlling mechanism as a transmitter and to the controlled mechanism as a receiver, although these designations may not be correct for every use of the invention.

The preferred form of receiver is an electro-magnetic step-by-step motor, and the preferred form of transmitter includes a similar motor running synchronously with the receivers and so controlling the relay that the latter, after having been caused by the first operation of the transmitter to close the operative circuit, is caused to open this circuit again when the receivers have completed the movement prescribed by the transmitter.

The accompanying drawings illustrate the invention in a form applicable to the control of gun-fire.

Fig. 15 is a diagram illustrating the electric circuits of the relay shown in Figs. 12-14.

Figures 1, 2, 3:
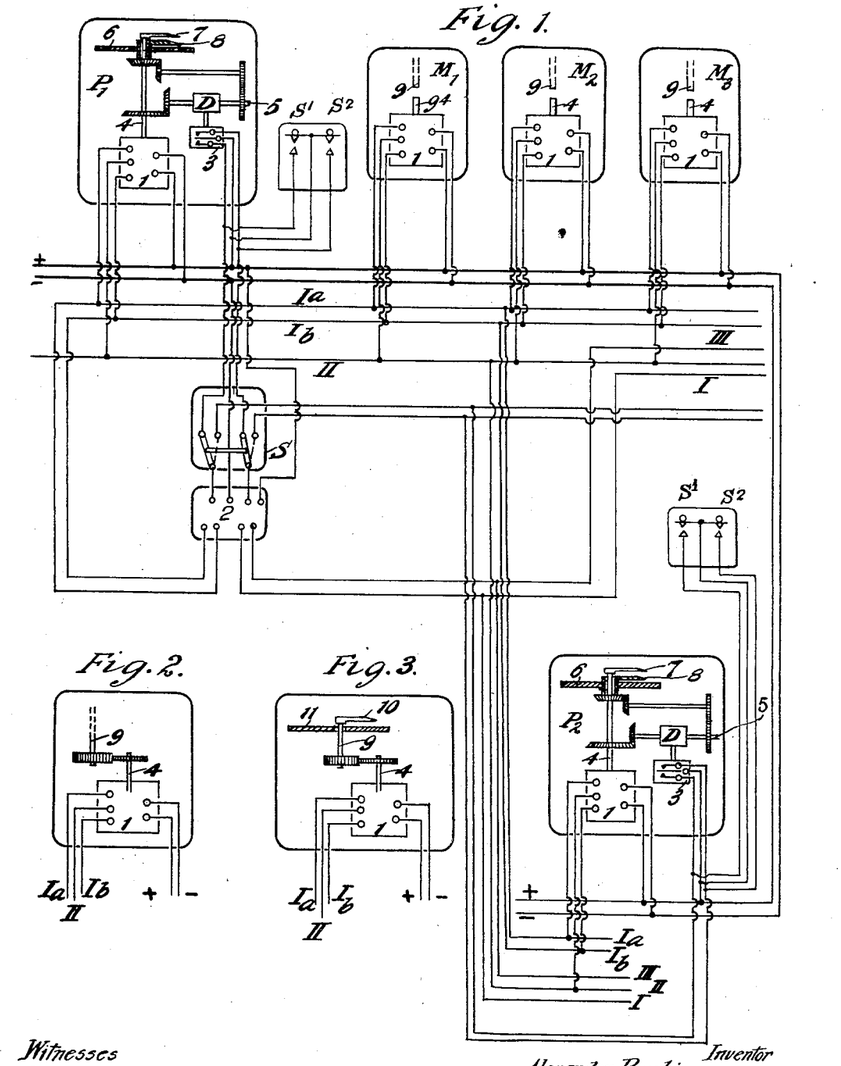
Figure 1 is a diagram of an installation of transmitter and receiver operated by a direct current and a three-phase alternating current.
Figs. 2-6 are diagrams each representing a different modification of the receiver.

In Fig. 1, $M_1$, $M_2$, $M_3$ represent receivers each comprising an electromagnetic motor 1 with shaft 4, and a shaft 9 driven by the motor shaft. $P_1$, $P_2$ represent transmitters each comprising an electromagnetic motor 1, similar to the motors of the receivers, the shaft 4 of which carries an indicating pointer 7 in front of a fixed dial 6. In the transmitters the shaft 4 is geared to a shaft of a differential gear D the second shaft 5 of which is the operating shaft of the transmitter and is geared to the pointer 8 adapted to move in front of the dial 6 independently of the pointer 7. The third shaft of the differential gear D drives a contact-maker 3, a particular form of which will presently be described. This contact-maker is electrically connected through the switch S with the relay 2. By turning the switch S the relay 2 can be disconnected from the contact-maker 3 of transmitter $P_1$ and connected with the contact-maker 3 of transmitter $P_2$, in which case the latter assumes the control of all the receivers.

The motors 1 (a suitable construction for which will presently be described) are connected in parallel with the leads +, — through which direct current is continuously flowing and with the leads I and II of one phase of the three phase current (leads I, II, III) when the relay has closed the circuit of the latter.

Assuming that the shaft 5 is turned, say by hand, until pointer 8 has moved from its original position into that desired, the contact-maker 3 is simultaneously turned through the differential gear D, and the circuit which actuates the relay 2 is closed; the latter closes the circuit supplying alternating current to the motors 1, whereupon all the motors rotate their shafts synchronously in the required direction.

The motor 1 at the transmitter, rotating synchronously with the other motors 1, turns the pointer 7 and also the contact-maker 3; but owing to the differential gear D the direction of rotation of the contact-maker by motor 1 is the reverse of that of its rotation by shaft 5. Hence the contact-maker is soon returned to its original position in which the circuit of the relay 2 is interrupted, whereupon the relay opens the alternating current circuit and all the motors come to rest. That they have stopped in the desired angular position of their shafts is indicated by the coincidence of pointers 7 and 8 in the transmitter.

Figure 4:
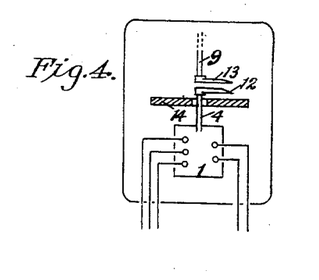
Figure 5:
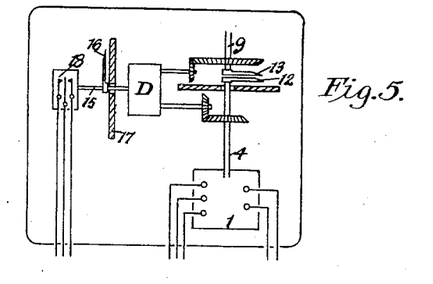
Figure 6:
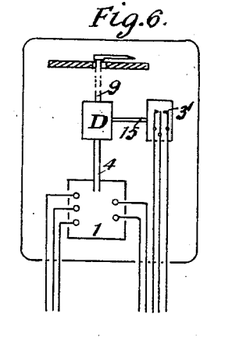

When the motors 1 in the receivers are sufficiently powerful to move the controlled mechanism the shafts 4 may be geared directly with the shafts 9 (Fig. 2), a simple case being that in which a pointer 10 is to be moved in front of a dial 11. (Fig. 3.) In some cases, however, the mechanism cannot be moved directly by the motor 1, or it may be necessary from time to time to set the several controlled mechanisms out of synchronism and then to return them to synchronism. Figs. 4 to 6 represent diagrammatically different modifications suitable in this case. In such cases the shafts 9 and 4 cannot be mechanically connected. Fig. 4 shows the application of the well-known system called "follow the pointer" to cases of this kind. The shaft 4 carries pointer 12 and the shaft 9 pointer 13, both in front of the dial 14; the pointer 13 is turned by hand to keep it in coincidence with the pointer 12.

In Fig. 5 the arrangement is also for the "follow the pointer" method. The shafts 4 and 9 are geared to two of the shafts of a differential gear D, the third shaft of which carries a pointer 16 in front of a dial 17. The gearing is such that so long as the pointers 13 and 12 are coincident or moving synchronously pointer 16 is at rest. This enables the setter to check his movement of pointer 13. A further check may be provided by connecting shaft 15 with a contact-maker 18 which closes a warning circuit when this shaft turns in either direction.

In Fig. 6 the shafts 9 and 4 are geared to two of the shafts of differential mechanism D, the third shaft 15 of which drives contact-maker $3^1$; the gearing is similar to that of Fig. 5. As long as the shafts 9 and 4 are coincident or moving synchronously the shaft 15 is at rest. This contact-maker $3^1$ controls directly or by means of intermediate relays the circuit of the motor which drives the mechanism and, consequently, moves the shaft 9 until it comes to synchronism with shaft 4. The contact-maker above mentioned is represented on Figs. 18–20 and will be described further.

By disconnecting electrically the contact-maker $3^1$ from the circuit of the driving motor the mechanism can be used without being affected by operation of the transmitter, but the motor 1 always moves synchronously with the transmitter and as soon as the contact-maker $3^1$ is connected to the circuit of the driving motor it begins again to control its circuit and thus to carry the shaft 9 in synchronism with the shaft 4.

As already stated the system is worked by means of a direct current and a current of periodically increasing and decreasing strength. When the latter current is a three-phase alternating current the preferred form of step-by-step motor is one in which the direct current holds the armature of the operative magnet in the attracted position while the motor is at rest, and in which the alternating current determines the oscillation of the armature and thus turns the motor shaft.

The preferred construction is shown in Figs. 7–10. To a base 21 are fastened two electromagnets having cores 22, 23 and windings 24, 25 respectively. The armatures 26, 27 of these magnets turn on pins 28, 29 respectively carried by brackets 30, 31, springing from the base. The upward movement of the armature is limited by the arms 32, 33 of the brackets 30, 31 toward which arms they are urged by springs 34, 35 fastened to the armatures at one end and pressing on the arms at the other end; the tension of these springs is adjusted by screws 36, 37.

Figure 7:
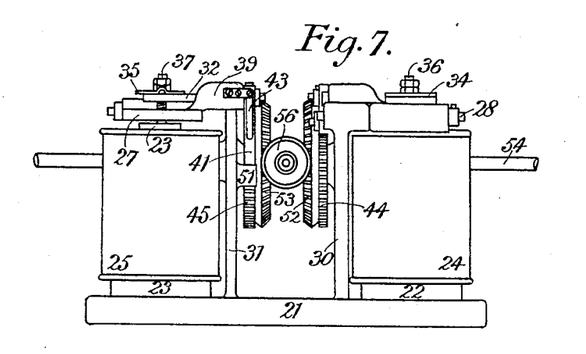
Fig. 7 is an elevation, Fig. 8 a plan and Fig. 9 a section on line $a$—$b$ of Fig. 8 of an electromagnetic motor suitable for the receivers.
Figure 8:
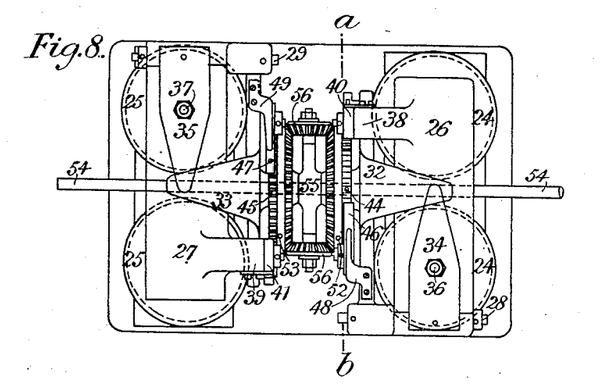
Figure 9:
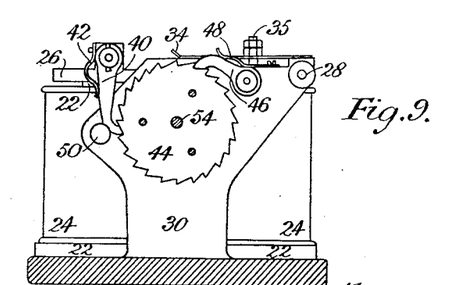

A lateral projection 38, 39 at the front end of each armature carries a pivoted pawl 40, 41, pressed by a spring 42, 43 to engage a ratchet wheel 44, 45. These two wheels, free on the shaft 54, are connected respectively with the wheels 52, 53 of the differential gear, of which the shaft 55 of the intermediate wheels 56 is keyed to shaft 54.

When armature 26 is attracted by its magnet to the core 22 pawl 40 turns ratchet wheel 44 (Fig. 9) through an angle corresponding with one tooth. Backward rotation of the ratchet wheels being prevented by detent pawls 46, 47, pressed by springs 48, 49 respectively, it follows that this rotational movement of ratchet wheel 44 will turn shaft 54 through the differential gear in the same direction. When armature 27 is attracted the movements are similar but in the opposite direction. The pins 50, 51 prevent the wheels 44, 45 from over-running.

Figure 10:
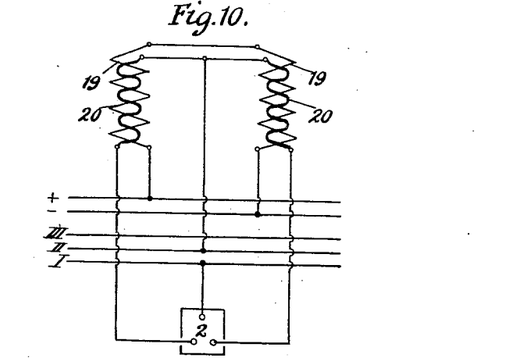
Fig. 10 is a diagram illustrating the electric circuits of the motor shown in Figs. 7-9.

As indicated in Fig. 10 each electromagnet has two windings; through one of these, 19, the direct current flows continuously between leads + and − and keeps the armatures attracted when the motor is at rest. Through the other winding 20, the alternating current flows between leads I and II, as determined by the relay 2. The ampere-turns of winding 20 are such that the effect of the ampere-turns of winding 19 (direct current) is alternately neutralized and reinforced by that of the alternating current, and the armature is alternately withdrawn by its spring and re-attracted once for each cycle of the alternating current.

Figure 11:
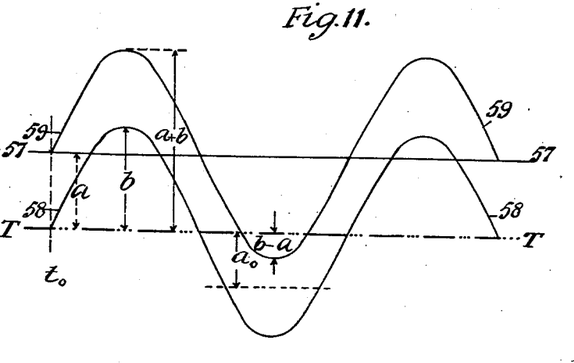
Fig. 11 is a diagram illustrating the use of alternating current in the motor.

The diagram, Fig. 11, shows the value of the ampere-turns of each winding at any moment within a lapse of time represented by the line T—T, the straight line 57 represents the constant ampere-turns $a$ of the direct current winding; the curved line 58 represents the fluctuating ampere-turns, having maximum $b$, of the alternating current winding; and the curved line 59 the resultant ampere-turns due to both currents. This line 59 shows in the cycle maxima $a+b$ and $b-a$. The windings must be such that $a > a_0 > (b-a)$, when $a_0$ is the ampere-turns necessary for attracting the armature. Under these conditions, when the alternating current traverses the winding from a moment $t_0$, the armature will be withdrawn and attracted once for each cycle of the alternating current.

Figure 12:
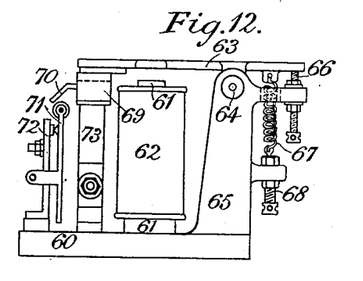
Fig. 12 is a side elevation, Fig. 13 a plan and Fig. 14 an end elevation of a relay suitable for the installation.
Figures 13, 15:
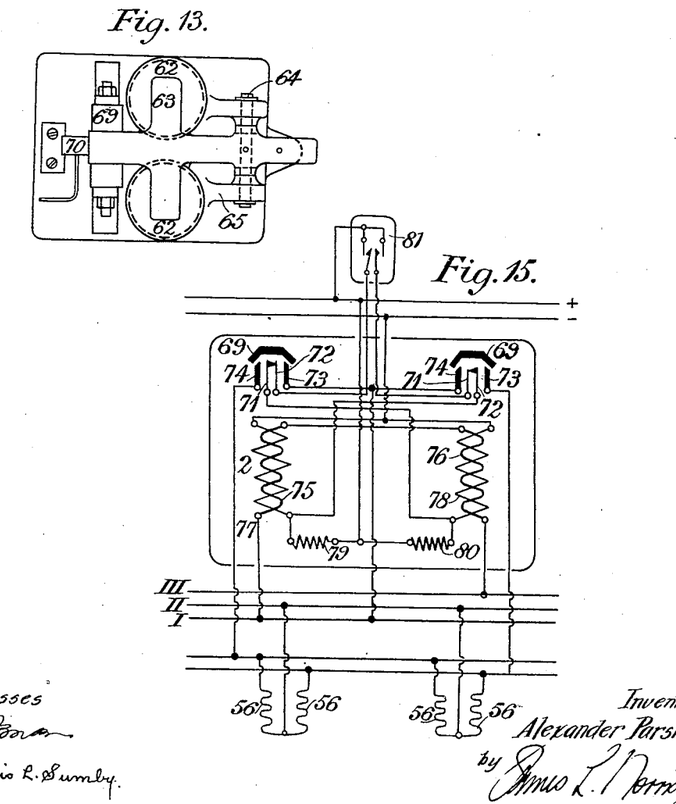
Figure 14:
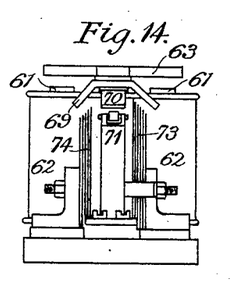

The preferred form of relay comprises two similar parts, one of which is shown in Figs. 12–14. To the base 60 is fixed the electromagnet having core 61 and coils 62. The armature 63 rocks on a pin 64 carried in uprights 65, and when not attracted is held with its tail end against an adjustable stop 66 by a spring 67, the tension of which can be adjusted by screw 68. The armature carries at its head end metal bars 69 and 70 insulated from each other and from the armature. When the armature is attracted first bar 70 bends the blade spring 71 to break the contact which normally exists between this spring and terminal 72, and then bar 69 electrically connects the spring blade contacts 73, 74 thus completing a circuit through the terminals to which they are attached respectively.

Each half of the relay has two windings, as indicated in the diagram Fig. 15. The windings 75, 76 (one in each part of the relay) are connected between leads III and I of the three-phase alternating current circuit. The windings 77, 78 (one in each part of the relay) are connected in parallel, through resistances 79, 80, respectively, with the direct current leads + and −. When one of these resistances is short-circuited by closing a switch 81 the armature of the part of the relay to which the resistance belongs is attracted, with the result that the spring 71 of this part of the relay is removed from the terminal 72. The spring 71 and terminal 72 are in the circuit for short-circuiting the resistance of the other part of the relay, so that when the armature of one part of the relay is being operated, that of the other part cannot be operated. The connection of the contacts 73 and 74 of the operated part of the relay completes the circuit of the alternating current through the windings 20 of the several motors 1.

Figure 16:
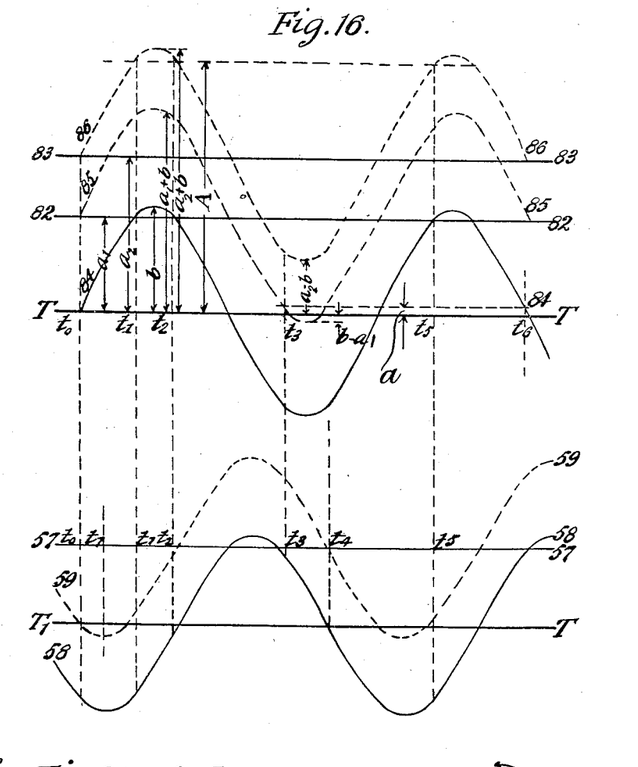
Fig. 16 is a diagram illustrating the use of alternating current in the relay.

The diagram Fig. 16 represents the variation of the ampere-turns in a winding of the relay brought about by short-circuiting the corresponding resistance 79 or 80. The line T—T represents a period of time and $t_0$ a moment therein. The straight line 82—82 represents the ampere-turns $a^1$ of the direct current when the resistance is in circuit, and the straight line 83—83 the like $a^2$ when the resistance is short-circuited. The curved line 84—84 represents the ampere-turns of maximum $b$ of the alternating current; the curve 85—85, the sum of the ampere-turns of the direct and alternating currents when the resistance is in circuit, the unequal maxima being $a_1+b$ and $b-a_1$; $b-a'$ represents the negative maximum of the combined ampere-turns when the resistance 79 or 80 (Fig. 15) is inserted in the direct current circuit the curve 86—86, the like sum when the resistance is short-circuited, in which case the maximum and minimum are $b+a_2$ and $a_2-b$ respectively.

The winding of each magnet and the resistances 79 and 80 should be so selected that $b$ is less than $a_2$ and a little greater than $a_1$.

When the tension of spring 67, as determined by adjustment of screw 68 (Fig. 12), and the stroke of the armature, as determined by adjustment of stop 66, are properly selected, the armature will be attracted when the combined ampere-turns has some value A greater than $a_1+b$ and less than $a_2+b$. The armature will be withdrawn when the said value has fallen to $a$, less than $a_2-b$.

Under these conditions, when a switch 81 short-circuits resistance 79 or 80 at any moment of the examined period of the alternating current, the attraction of the armature can begin only during the interval of time $t_1-t_2$ of the period or at the time $t_5$ of the next period. When the switch reintroduces the resistance the armature begins to be withdrawn after the moment $t_3$ or the corresponding moment $t_6$ in the next period.

The lower part of the diagram Fig. 16 shows the curves 57, 58, 59 of Fig 11 corresponding with the same moments of time but referred to a different phase of the three-phase current. Since windings 20 of the motor are between leads I and II of the three-phase current (curve 58) and windings 75, 77 of the relay are between leads III and I of this current (curve 84), the alternating current through the motor is in advance of that through the relay by about two-thirds of its period. As already stated the withdrawal of the relay armature which opens the circuit through the alternating current winding 20 of the motor can occur only at a moment closely following $t_3$ so that any sparking which may occur will not be injurious. By proper adjustment of the spring 67 this moment can be so close to the moment $t_4$ of zero current strength in the circuit opened, that the formation of sparking is excluded.

From this moment of opening the circuit the armatures of the motors all remain in attracted position, so that this mode of controlling the motors through such relay insures that all motors in the receivers after finishing the work remain in synchronous position with their commanding motor.

When the resistance 79 or 80 is short-circuited the relay can attract its armature and close the alternating current circuit through the motors only during the part $t_1-t_2$ of the period (or during the corresponding part of the next period) when the combined ampere-turns have the value greater than A. It is a well-known fact that the tension is in advance of the magnetizing current by one quarter period; therefore in this case the tension of the alternating current of motors will be equal to zero at the moment $t_1$ and has the positive value during the interval $t_1-t_2$, it follows that after the circuit is closed the combined ampere-turns in the motors first begin to rise thus preventing the motors from moving out of synchronism when starting.

From what has been said it will be seen that the system involves two important advantages:—(1) that the current is controlled without formation of injurious sparks and (2) that only one closing and one opening of the circuit is requisite however many impulses are required in the motors.

The actuation of the relay 2 resolves itself into the cutting out of circuit of one or other of the resistances 79, 80 by means of some form of switch such as 81, which has been herein called a contact-maker. This switch may be operated by hand, but it is a feature of the invention that it shall be operated in dependence on the motion of shafts 4 and 5 in a transmitter or (in the case of Fig. 6) of shafts 4 and 9 in a receiver.

For this purpose the contact-maker, represented by 3 in Fig. 1 and $3^1$ in Fig. 6, is operated by means of a differential gear D. A suitable construction of contact-maker is shown in Fig. 17.

A disk 89 is mounted fast on a shaft 88 and has a recess in its periphery adopted to receive a pin 90 carried by a lever 91 turning on a pin 92 fixed in a base 93. The pin 94 at the other end of the lever 91 is between the arms of a spring 95 carried on the hub of the lever 91. These arms also engage an insulated pin 96 on a second lever turning on a pin 99 and carrying contacts 97 and 98 in electrical connection with terminal 100. The contacts are adapted, in the extreme positions respectively of the lever carrying them, to bear against terminals 101 and 102, which together with terminal 100 are mounted in insulated manner on the base 93.

Figures 17, 20:
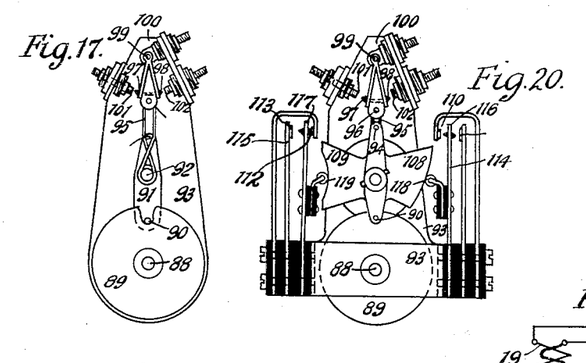
Fig. 17 is an elevation of a contact-maker suitable for controlling the relay.
Fig. 20 is an elevation of a further modification of contact-maker.

When the resistances 79 and 80 (Fig. 15) are both in circuit the position of the parts just described is that shown in Fig. 17. When shaft 88 is turned, say clockwise, the lever 91 is turned in the opposite direction and contact 97 comes in contact with terminal 101, immediately short-circuiting one of the resistances, say 79; as the turning of the shaft continues, pin 90 rides out of the recess and bears upon the periphery of the disk 89. At the same time spring 95 is put under tension by pin 94, thus keeping contact 97 closely against terminal 101 and pin 90 against disk 89.

When the rotation of shaft 88 is reversed, or the base 93 is turned through the same angle in the same direction, pin 90 will re-enter the recess and the parts will return to the position shown in Fig. 17.

Figure 18:
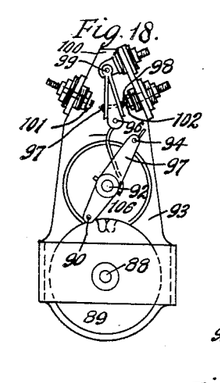
Fig. 18 is an elevation of a modified form of contact-maker.
Figure 19:
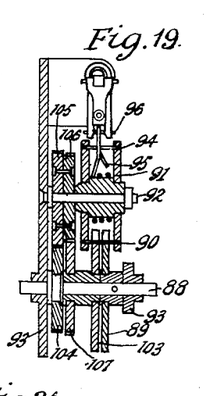
Fig. 19 is a longitudinal section of the contact-maker shown in Fig. 18 through the axles thereof.

This construction presupposes that the position of open circuit is to be resumed before the shaft 88 has turned through an angle of approximately 360°. When angular movement greater than this is required the construction may be modified as shown in Figs. 18 and 19. Here the disk 89 is supplemented by another similar disk 103 mounted free on the shaft and coupled to it by the gear 104, 105, 106, 107 such that both disks rotate together in the same direction but at different speeds. In the same circuit position the recesses on the disks coincide and the pin 90 enters both; after one revolution the recesses are out of register at least sufficiently to prevent the pin from entering either (as indicated in Fig. 18) and do not again come into such register that the pin can enter both, until after a number of revolutions depending upon the ratio of the said coupling gear.

It is sometimes desirable that the contact-maker shall control one or more circuits in addition to those which operate the relay. Fig. 20 shows sectors 108, 109, fixed to the lever 91 and metal strips mounted on the base 93 (but insulated from it and from each other) and constituting terminals in the circuits in question. These strips carry contacts 110, 111, 112, 113 adapted to receive double contacts 116, 117 on blade springs also mounted in insulated manner on the base. Rollers 118, 119 carried by and insulated from the blade springs respectively bear upon the periphery of the sectors 108 and 109. These peripheries are so shaped that in the open circuit position for the relay contacts 117 and 112 touch each other, while spring 114 is in open circuit position. The changes produced when the lever 91 is moved to the right or to the left will be apparent from inspection of Fig. 20.

This particular form of contact-maker is useful in the case of the receiver diagrammatically represented in Fig. 6, when it is required to move the mechanism sometimes with a higher speed than that with which it usually works, then contacts 97—101 and 98—102 control the normal low speed moving while the other contacts are to be applied to obtain the number of higher speeds.

Again, this contact-maker may also control the firing circuit, making it impossible for the gunner to fire the gun unless the contact-maker is in its middle position (when 117 is in contact with 112) or either of its end positions (when 117 is in contact with 113).

Any of these forms of contact-maker is for the purpose of electrically connecting two shafts, the shaft 88 may be connected directly or through gearing with one of the said shafts and the base 93 with the other. But the preferred arrangement is the connection of the shafts to be electrically connected by a differential gear, the third shaft of which is connected with shaft 88, the base being fixed.

Figures 21, 22, 23:
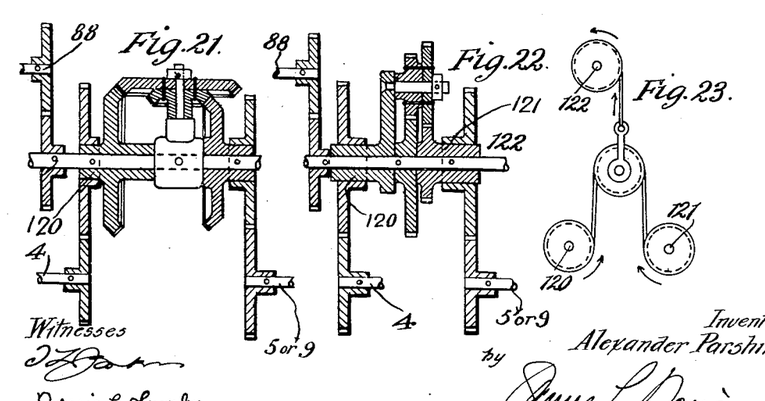
Figs. 21-23 show respectively forms of differential gear suitable for the invention.

The most simple differential mechanisms for this purpose are shown in Figs. 21, 22 and 23 with bevel gear, spur gear and flexible transmission respectively.

When the angular movement of two shafts is to be proportional (for instance, shafts 4 and 5 or 4 and 9, Fig. 1) they can be coupled by gearing to two axles (120 and 121, 120 and 122, or 121 and 122) of a differential mechanism such that the third axle of this mechanism is at rest when the other two are rotating synchronously. The shaft 88 being coupled to the third axle, the lever 91 will remain in the middle, open-circuit, position so long as shafts 4 and 5 have their normal position. When shaft 5 is turned lever 91 is turned to close the circuit of the relay, whereupon motors 1 are started and shaft 4 turns, and retards the movement of shaft 88 until shafts 5 and 4 are turning synchronously, whereupon shaft 88 remains at rest. When the turning movement of shaft 5 ceases the continued movement of shaft 4 rotates shaft 88 in the reverse direction until pin 90 enters the notch in disk 89 and the relay circuit is opened.

For the purpose of explanation I will describe the application of the contact-maker and differential gear for the electrical connection of the shafts 4 and 9 in the receiver diagrammatically shown on the Fig. 6 more in detail. Supposing that (1) the differential gear (Fig. 23) with all wheels of the same diameter is chosen and (2) that the shafts 4 and 9 of the receiver (Fig. 6) must turn in the same direction and to the same angles to keep themselves in synchronism with the controlling shaft 5. Then the shafts 4 and 9 may be connected directly with the shafts 120 and 121 (Fig. 23) and the shaft of the contact-maker 88 (Figs. 18, 19, 20) with the shaft 122. This last connection must be performed securing such a condition that the shafts 4—120 and 9—121 are put into the accorded positions and the shaft 88 into its mean position when the contacts 97—101 and 98—102 (Figs. 18, 19 and 20) are off.

Then if the shaft 4—120 is turned through any angle $\triangle \alpha$ clockwise, for instance, from its starting position, the shaft 122—88 will turn from its starting position through the angle $\frac{1}{2}\triangle \alpha$ in the same direction and one pair of contacts, 97—101 for instance, will be put into connection, causing the rotation of the motor which sets the receiver in motion in such direction that the shaft 9—121 would also turn clockwise.

The shaft 122—88 will then turn in the opposite direction (under the impulse of the spring not shown on the Fig. 23) and when the shaft 9—121 turns through the angle $\triangle \alpha$, the shaft 122—88 will return into its starting (mean) position and the contacts 97—101 will break the circuit and the motor will stop.

If the shaft 4—120 turns contra-clockwise all the events would occur in the opposite direction to that above described; the contracts 98—102 would come into connection and the motor in the receiver would turn in the other direction and the circuit would be broken by the returning of the shaft 88—122 to its starting position.

If it is desired that the angles of the turns of the shafts of transmitter and receiver, for the desired motion, should not be equal, this can easily be done by the introduction of intermediate gearings between the shafts 4 and 120 or 9 and 121 or by the proper changing of the diameters of the wheels secured to the shafts 120 and 121.

Figs. 21 and 22 show diagrammatically the method of connecting the differentials to the shafts 5—4 or 4—9 and to the shaft 88 by means of the intermediate tooth wheels.

It frequently happens, for instance when repairs have been made, that all the receivers are not in the correct starting position before an order or movement has to be transmitted.

Figure 24:
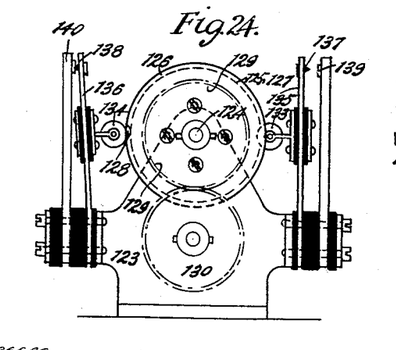
Fig. 24 is an elevation and Fig. 25 a longitudinal section of a contact device for bringing to the same angular position the shafts of the receivers and transmitters when for any reason these shafts have ceased to be in the same angular position.
Figure 25:
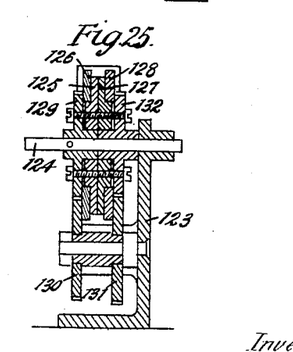

Figs. 24 and 25 show an apparatus by means of which all the shafts can be brought into the correct starting position by an operation performed at the transmitting or controlling station.

In a bracket 123 is journaled a shaft 124 to which are keyed two disks 125, 126 each having a peripheral recess; two similar disks 127, 128, also each having a peripheral recess, turn freely on the shaft 124 and are connected with disks 125, 126 by the spur gearing 129, 130, 131, 132. The transmission is such that during every turn disks 127 and 128 are in advance of or behind the disks 125 and 126 by the length of the recess. Blade spring 135 carries a roller 133 and presses it against the peripheries of disks 125 and 127, while blade spring 136 carries a roller 134 and presses it against the peripheries of disks 126 and 128. Thus when one of the rollers meets the two recesses in register with each other, it enters them.

Springs 135, 136 carry contacts 137, 138 respectively which are normally held against corresponding contacts 139 and 140, but are withdrawn from them when roller 133 or 134 respectively enters the registering recesses as aforesaid.

The shaft 124 is coupled directly or by gearing to shaft 4 and in one of the extreme positions of the latter the recesses of two of the disks, say 125, 127, register with each other so that the corresponding roller, 133, enters them and the circuit through contacts 137, 139 is interrupted. In the other extreme position of shaft 4 the recesses of disks 126 and 128 come into register and are entered by roller 134, interrupting the circuit through contacts 138, 140.

Figure 26:
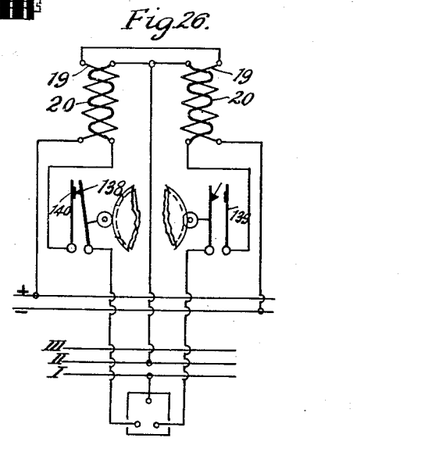
Fig. 26 is a diagram illustrating the electric circuits of the device shown in Fig. 24.

Fig. 26 is a diagram showing how the apparatus just described operates. The contacts 137—140 are in the circuits of the alternating current, as indicated. When the motor 1 has moved its shaft 4 into either extreme position the current is interrupted at the corresponding pair of contacts and the shaft must stop in this position.

For setting all the shafts 4 with aid of this apparatus the controlling station has two switches $S_1$ and $S_2$ (Fig. 1), one short-circuiting the contacts 97 and 101 of the contact-maker 3 and the other the contacts 98 and 102 thereof. When one of these switches is closed the corresponding resistance 79, 80 of relay 2 is short-circuited and the motors are started, including that at the controlling station. The shaft 5 at this station, however, is not operated so that the contact-maker 3 comes into operation to short-circuit the other resistance of the relay; but such short-circuiting cannot occur because the necessary circuit is interrupted at contacts 71, 72 (Figs. 12 and 15) of the half of the relay already operative. After a time all the motors come to rest with their shafts in the extreme position, as explained in connection with Fig. 26. When the switch for short-circuiting the resistance 79 or 80 is now opened the relay is subject to the action of the contact-maker for bringing all the motor shafts into the position corresponding with shaft 5.

Figure 27:
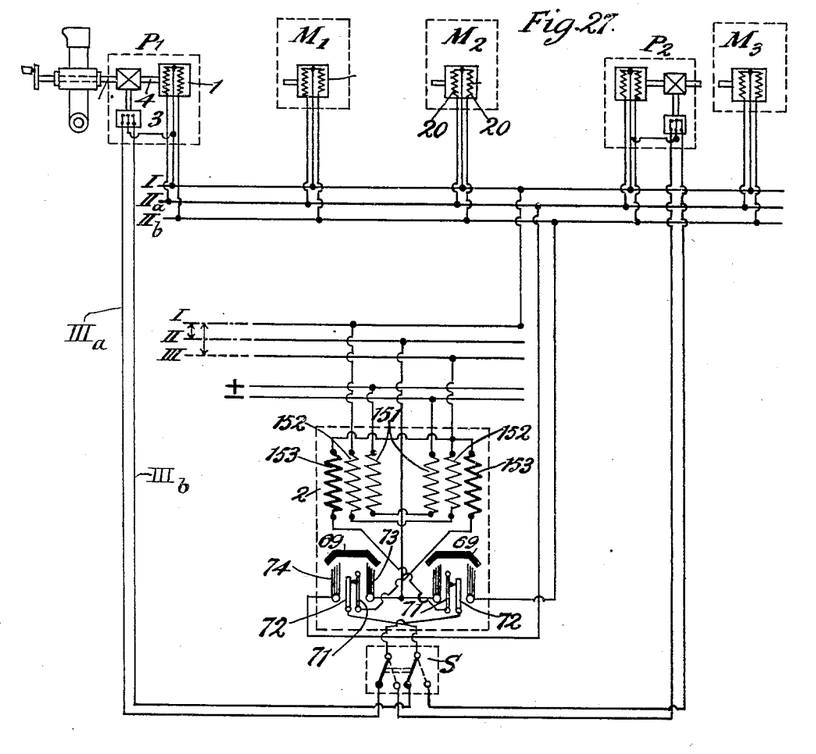
Fig. 27 is a diagram illustrating the installation of transmitters and receivers when it is operated by a pulsatory current.

The diagram Fig. 27 shows a modification of the system when pulsatory current is substituted for alternating current.

As in Fig. 1 the receivers $M_1$, $M_2$, $M_3$ can be controlled from either transmitter $P_1$, $P_2$ according to the setting of switch S. The controlling shaft 5 and the motor shaft 4 of the transmitter are connected as before by a differential gear D, the third shaft of which is connected with the contact-maker 3 that controls the relay 2.

Figure 28:
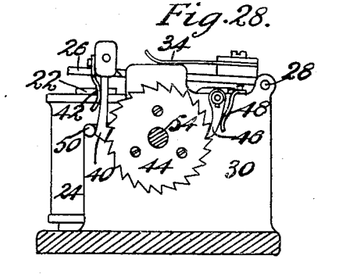
Fig. 28 is a section corresponding with that shown in Fig. 9 indicating a modification of the electromagnetic motor.

The motors 1 are operated solely by pulsatory current and the construction described with reference to Figs. 7, 8 and 9 is modified as shown in Fig. 28, a view corresponding with that shown in Fig. 9, the parts similarly numbered in the two figures having like functions. In this modified construction the spring 34 is carried by the armature 26 and presses on a part of the bracket 30, keeping the armature in the withdrawn position. This is the armature's position of rest; when attracted its pawl 40 rides over a tooth of the ratchet wheel 44 (prevented from backward rotation by detent 46), and when released its pawl turns the ratchet through an angle corresponding with the tooth.

Figure 29:
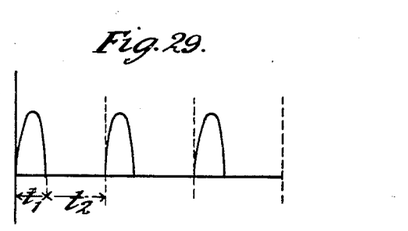
Fig. 29 is a diagram representing the use of pulsatory current in the motor.

Each of the magnets has a single winding 20 (Fig. 27), one in circuit between the pulsatory current lead I and the lead II$^a$, the other between the pulsatory current lead I and the lead II$^b$, leads II$^a$ and II$^b$ being connected to the other pulsatory current lead II when the relay is at work. The current is such that each pulsation occupies the smaller part of the cycle; that is to say, as shown in Fig. 29, the interval of time $t_1$ between the beginning and the end of the pulsation is less than that, $t_2$, between the end of one pulsation and the beginning of the next, and during this interval, of course, there is no current. Every pulsation of the current causes an attraction of the armature and every withdrawal of the armature is a working stroke of the motor.

The mechanical construction of the relay is identical with that already described, but each magnet has three windings; of these one (151, Fig. 27) is constantly traversed by the direct current; the second (152) is constantly traversed by the pulsatory current; the third (153) is traversed by the pulsatory current only when the armature 69 is to be attracted, and in this case the two windings are in parallel.

Figure 30:
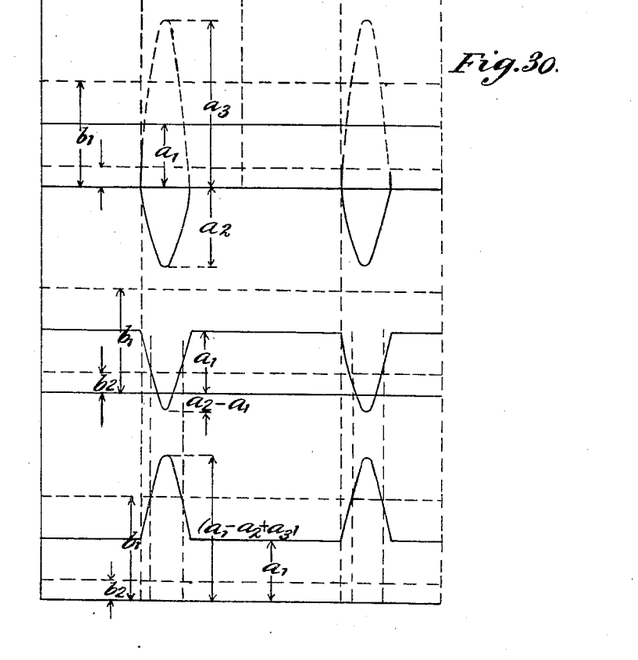
Fig. 30 is a diagram representing the use of pulsatory currents in the relay.

Fig. 30 is a diagram showing how these windings are proportioned to attain the desired result, namely the closing and opening of the circuit of the motors only at moments when the strength of the pulsating current in that circuit is zero value or substantially so, thereby insuring synchronous working and absence of sparks. The arrangement is such that (1) the ampere-turns $a_1$ of the direct current winding 151 are not sufficient for moving the armature into the attracted position (which requires ampere-turns represented by $b_1$) but more than sufficient for keeping it in the attracted position when it has been brought thereinto (which requires ampere-turns represented by $b_2$); (2) the maximum, $a_2$, of the ampere-turns of the pulsatory current of the winding 152 is greater than the ampere-turns $a_1$ and the direction of magnetization produced by the current is opposite to that produced by a direct current, the difference $a_2-a_1$, however, does not suffice to attract the withdrawn armature (that is to say, $a_2-a_1$ is smaller than $b_1$); (3) the direction of magnetization produced by the pulsatory current traversing winding 153 coincides with that produced by the direct current of winding 151, the maximum ampere-turns ($a_3$) is considerably greater than that ($a_2$) of winding 152 and the algebraic sum, $a_1-a_2+a_3$, is greater than is necessary for bringing the withdrawn armature into attracted position (that is to say, $a_1-a_2+a_3$ is greater than $b_1$).

Figure 31:
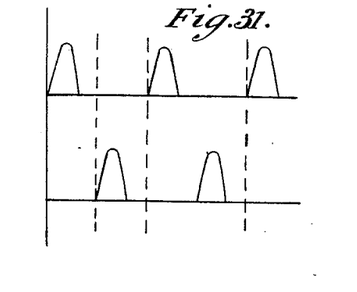
Fig. 31 is a diagram representing the relationship between the pulsations of current in the motor and in the relay.

The pulsatory current of the relay is the same as that of the motors, but the pulsations are displaced by one half of the cycle relatively to the pulsations of the motor current, as represented in Fig. 31, in which the upper curve may be supposed, for instance, to represent the motor current (between leads I and II) and the lower the relay current (between leads I and III).

Now (1) when the windings 153 are out of circuit, the armatures of both parts of the relay are kept in their withdrawn positions by force of their springs, though the other two windings in each case are traversed by their currents; (2) when the winding 153 is put into circuit, the corresponding armature is attracted at the moment near to the maximum of the next pulsation and between the two pulsations will remain in the attracted position by force of the direct current, reinforced during each pulsation by that of the pulsatory current; (3) when the circuit of the third winding is interrupted, the armature is withdrawn from the core of the magnet by the spring at the moment near to the maximum of the existing pulsation or of the next one and then will remain in the withdrawn position.

By adjustment of the tension of spring 67 (Fig. 12) and of the position of stop 66, the values $b_1$ (number of ampere-turns necessary for attracting the withdrawn armature) and $b_2$ (number of ampere-turns necessary for holding the attracted armature) may be such that (1) the relay will work notwithstanding great variation in voltage of the direct and pulsatory currents, or (2) the permissible diminution of the voltage is limited to the desired extent.

In the latter case the relay would not attract its armature when the voltage fell so far as to produce a synchronism between the motors (50 per cent.–70 per cent. from maximum, for instance).

The relay is in circuit through the contact-maker 3 but has not the resistances 79 and 80 described with reference to Fig. 15. When the contact-maker (which is identical with that already described) closes one of its pairs of contacts the circuit (Fig. 27) is from lead I through the said contacts and the contacts 71, 72 (see also Fig. 12) of one half of the relay and then through the winding 153 of the corresponding half of the relay to lead III. The corresponding armature 69 is attracted and opens the contacts 71, 72 of this half of the relay, so that the other half cannot be operated until after the contact-maker has returned to its middle position.

The following example will give a short description of the operation of the invention:—

Suppose that for controlling the aiming of the torpedo tubes of a destroyer it is necessary to transmit the bearings automatically from a central telescope (panoramic type) by the system working with pulsatory current.

Referring to Fig. 27, from the position of the switch S it is clear that the control is working from the left commanding post P¹; the contact maker of the second post is cut off by the switch S. The panoramic part of the telescope is turned by the aid of the wheel fastened to the shaft bearing the worm screw and acting as the control shaft of the transmitter.

The latter consists of: the motor 1 connected in the circuit in parallel with the motors 1 of the receivers, the contact-maker 3 and a differential gear D, like that shown in Fig. 21, for example.

The receivers M₁ M₂ M₃ have the motors 1 which directly or by gearing are acting upon the pointers showing the bearings on the dials (not shown in the figure).

Suppose that at the beginning of the operation the receivers are put in accord with the panoramic part of the telescope and the contacts 97—101 and 98—102 of the contact-maker 3 of the transmitter are in the "off" position, then the pointers show the bearing of the panorama and all the motors are out of circuit.

When the panoramic part of the telescope is turned by aid of the wheel, the shaft 88 of the contact-maker 3 will be turned from its mean position through the turning of the differential gear, and one pair of contacts (97—101 or 98—102) will connect the circuit through one of the coils 153 of the relay 2 with the lines III^a or III^b, one of the armatures of relay 2 will attract itself and connect the circuit of one of the coils 20 of the motors 1 to the lines II^a or II^b. All motors then begin to work and those in the receivers will rotate their pointers and the one in the transmitter will tend by means of the differential gear to put the contact-maker into its mean position.

When the turning of the wheel of the panorama ceases, the motor will return the shaft 88 of the contact-maker into its mean position breaking its contacts, and the circuit of the motors will be broken off, by breaking it at the contacts of the armature of the relay and all the motors will stop, having turned their shafts during operation through equal angles from their starting positions.

It is evident that the pointers will now show the new bearing of the panorama.

I claim:—

1. A system of operating electrically synchronous mechanisms from a distance, comprising an electric circuit carrying current which periodically increases and diminishes in strength, electric motors adapted to be operated by such current and connected in parallel in the circuit, means for closing the circuit when the condition of the said current is such that the synchronous mechanisms cannot immediately operate and means for opening the circuit at moments when the current strength therein is about zero value.

2. A system of operating electrically synchronous mechanisms from a distance, comprising motors adapted to be operated by a current which periodically increases and diminishes in strength, a circuit including the said motors in parallel and supplied with such current, and a relay controlling the circuit and adapted to operate to close the circuit when the condition of the said current is such that the synchronous mechanisms cannot immediately operate and again to open it at moments when the strength of the current therein is about zero value.

3. A system of operating electrically synchronous mechanisms from a distance, comprising electric motors adapted to be operated by current which periodically increases and diminishes in strength, a circuit carrying such current in which the motors are connected in parallel, an electro-magnetic relay adapted to be operated by the combined resultant of current which periodically increases and diminishes in strength and direct current, circuits carrying such currents in which the relay is included, means for closing the circuit of the motors by operation of the relay and means for varying the ampere turns in the relay for the purpose of operating it at moments when the strength of the current in the first circuits is about zero value.

4. A system of operating electrically synchronous mechanisms from a distance comprising electric motors adapted to be operated by current which periodically increases and diminishes in strength, a circuit carrying such current in which the said motors are connected in parallel, an electromagnetic relay adapted to be operated by the combined resultant of current which periodically increases and diminishes in strength and direct current, a circuit carrying the periodic current in which the relay is included when it is to operate, a circuit carrying the direct current in which the relay is continuously included, a resistance in the direct current circuit, means for closing the circuit of the motors by operation of the relay and means for short-circuiting the said resistance so as to operate the relay.

5. In a system of the kind herein described having an electric circuit carrying current which periodically increases and diminishes in strength and a single relay controlling such circuit, a direct current circuit, electro-magnetic step-by-step motors connected in parallel in each circuit, a winding to each motor traversed continuously by the direct current and a winding to each motor traversed by the increasing and diminishing current when the circuit of that current is closed, the two windings being such that the ampere-turns due to the direct current are neutralized and exceeded by those due to the other current in every cycle of the latter, whereby the motor is operated.

6. In a system of the kind herein described having an electric circuit carrying current which periodically increases and diminishes in strength and a single relay controlling such circuit, a direct current circuit, electro-magnetic step-by-step motors connected in parallel in each circuit, each motor comprising two electromagnets, a pivoted armature to each magnet, a winding to each magnet constantly included in the direct current circuit so that the armatures are normally in attracted position, a winding to each magnet adapted to be included in the varying current circuit by the said relay, and means whereby the armature after it has been released from its attracted position is again attracted to turn the motor one step, the two armatures producing this turning movement in opposite directions and the said windings being such that the armature is released and again attracted at every cycle of the varying current so long as that circuit is closed.

7. In a system of the kind herein described having an electric circuit carrying current which periodically increases and diminishes in strength and electric motors connected in parallel in the circuit, a direct current circuit, an electromagnetic relay in two similar parts, a pivoted armature to each part, contacts adapted to be electrically connected by the armature in its attracted position to close the circuit of the electric motors, a winding to each part continuously traversed by the direct current, means for causing the varying current to supplement the direct current so as to attract the armature when the motor circuit is to be closed, means operated by the attracted armature to prevent attraction of the other armature until the first is released, and means for insuring that the release of the armature shall occur at a moment when the resultant current strength in the relay is at about the minimum.

8. A system operating electrically synchronous mechanisms from a distance, comprising a three-phase alternating current circuit, a direct current circuit, electric motors connected in parallel in one phase of the alternating current circuit and in the direct current circuit and adapted to be operated by the resultant effect of the combined currents, and a single relay adapted to close and open the alternating current circuit in which the motors are included.

9. In a system of the kind herein described having a three-phase alternating current circuit, a direct current circuit and a single relay controlling the alternating current circuit, electromagnetic step-by-step motors connected in parallel in one phase of the alternating current circuit and in the direct current circuit, two electromagnets in each motor, a pivoted armature to each magnet, a spring adapted to withdraw each armature from its magnet, a shaft to each motor, means for turning the shaft one step in one direction when one armature is operated and one step in the other direction when the other armature is operated, a winding to each magnet constantly traversed by the direct current the ampere-turns of which keep the armature normally in the attracted position, and a winding to each magnet traversed by the alternating current when the relay closes the circuit, the ampere-turns of which winding alternately neutralize and reinforce those of the direct current so that the armature is alternately withdrawn by its spring and again attracted.

10. In a system of the kind herein described having a three-phase alternating current circuit and a direct current circuit and electromagnetic step-by-step motors connected in parallel in both circuits, an electromagnetic relay which is constantly traversed by the direct current and is operated to close the alternating current motor circuit by cutting out a resistance in the direct current circuit.

11. In a system of the kind herein described having a three-phase alternating current circuit and a direct current circuit and electromagnetic step-by-step motors connected in parallel in both circuits, an electromagnetic relay in two similar parts adapted to close the alternating current motor circuit and to control that current according to which part of the relay is operative, a winding to each part of the relay constantly traversed by the direct current, a resistance in the circuit of each of these windings, a second winding to each part of the relay constantly traversed by the alternating current, means for cutting out the resistance of one direct current winding when the relay is to operate, means for preventing simultaneous cutting out of the resistance of the other direct current winding, and means for timing the operation of the relay so that the circuit is opened at moments when the algebraic sum of the ampere-turns in the relay circuits and the alternating current strength in the motor circuit are about zero value.

12. A system of operating electrically synchronous mechanisms from a distance, comprising motors adapted to be operated by a current which periodically increases and diminishes in strength, a circuit including the said motors in parallel and supplied with such current, a relay controlling the circuit and adapted to operate to open the circuit at a moment when the strength of the current therein is zero value, a central station, a contact-maker in the circuit of the relay adapted to be closed to actuate the relay by an operation at the central station, and means whereby one of the said motors opens the said contact-maker when the motors have performed their desired movement.

13. A system of operating electrically synchronous mechanisms from a distance comprising a transmitter and a number of receivers, each having an electric motor adapted to turn synchronously with all the other motors, a circuit carrying current which periodically increases and diminishes in strength, in which circuit all the motors are included in parallel, a relay adapted to control the said circuit and to open it at a moment when the current strength in it is zero value, a shaft at the transmitter adapted to be turned through an angle corresponding with that through which each motor is required to turn, a contact-maker at the transmitter included in the circuit of the relay, and a differential gear connected (1) with the said shaft at the transmitter, (2) with the motor at the transmitter and (3) with the contact-maker and such that the turning movement of the shaft closes the contact-maker and the turning movement of the motor opens it again when this motor and therefore all the other motors have turned through the angle corresponding with that through which the said shaft was turned.

14. A system of operating electrically synchronous mechanisms from a distance comprising a transmitter and a number of receivers, each having an electric motor adapted to turn synchronously with all the other motors, a circuit carrying current which periodically increases and diminishes in strength, in which circuit all the motors are included in parallel, a relay adapted to control the said circuit and to open it at a moment when the current strength in it is zero value, a contact-maker included in the circuit of the relay and adapted to be operated at the transmitter for actuating the relay, means at the transmitter for closing and opening the relay circuit independently of the said contact-maker and means at each motor for stopping itself in either of two extreme positions of control, so that all the motors can be brought into the correct starting position at any desired moment by an operation performed at the transmitter.

In testimony whereof I have signed my name to this specification.

ALEXANDER PARSHIN.